July 5, 1927.
R. P. MASE
1,634,331
METHOD OF AND APPARATUS FOR QUANTITATIVE DETERMINATION OF GAS
Filed May 15, 1926   2 Sheets-Sheet 1
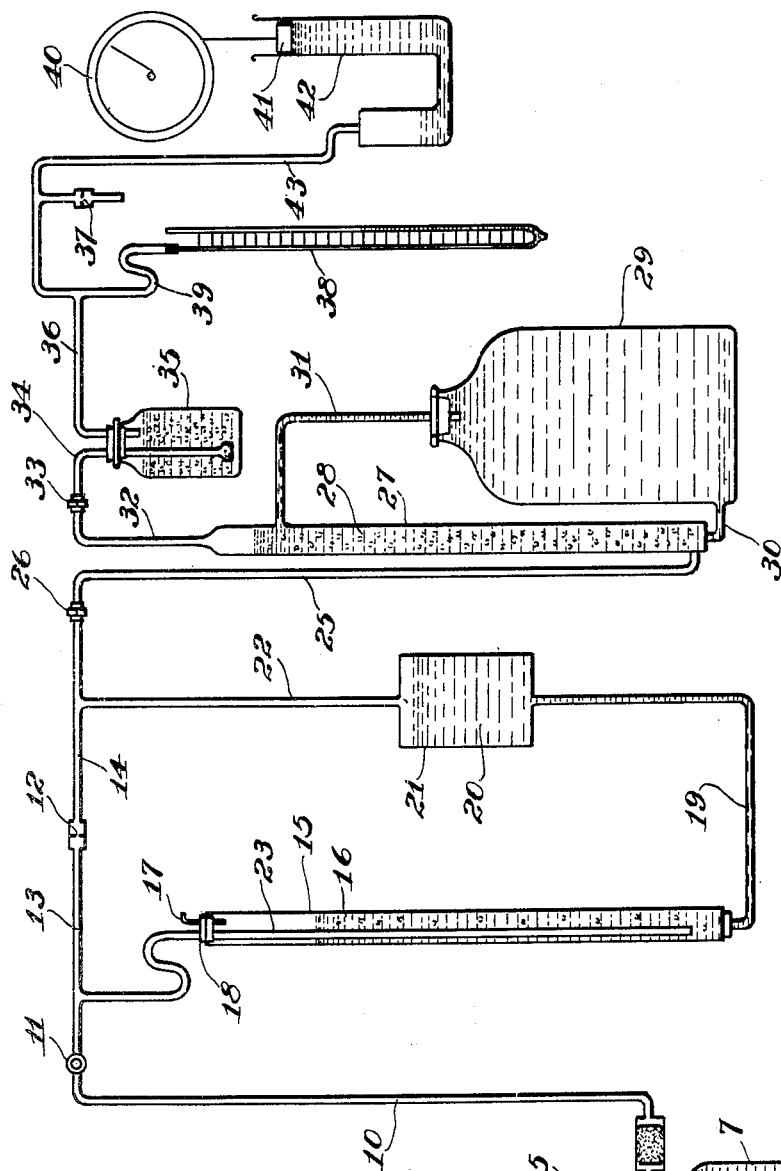
Fig. 1.
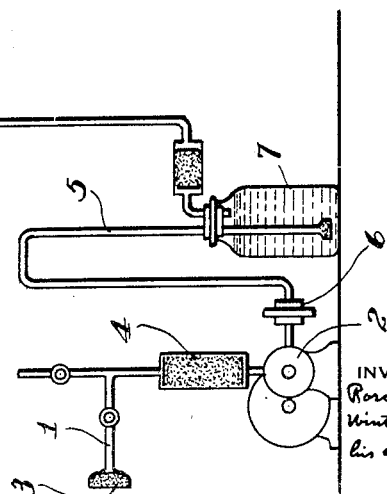
INVENTOR
Roscoe P. Mase, by
Winter, Brown & Critchlow,
his attorneys.

July 5, 1927.
R. P. MASE
1,634,331
METHOD OF AND APPARATUS FOR QUANTITATIVE DETERMINATION OF GAS
Filed May 15. 1926    2 Sheets-Sheet 2
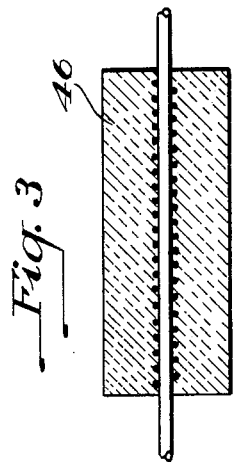
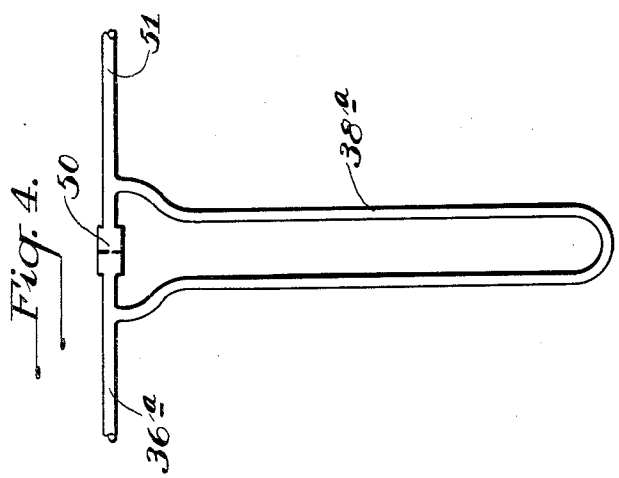
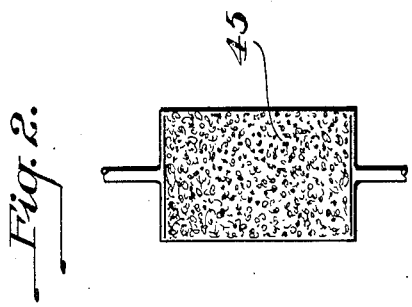
INVENTOR Patented July 5, 1927.

1,634,331

UNITED STATES PATENT OFFICE.

ROSCOE P. MASE, OF WILKINSBURG, PENNSYLVANIA.

METHOD OF AND APPARATUS FOR QUANTITATIVE DETERMINATION OF GAS.

Application filed May 15, 1926. Serial No. 109,276.

The invention has to do with a method of and apparatus for continuously determining the amount of a given gaseous constituent present in a mixture of gases, and finds applicability in a large variety of industrial uses, as for example in the continuous quantitative determination of methane, carbon monoxide or other explosive or poisonous gases in a mine, of oxygen or nitrogen or both contained in casing head or natural gas, and of carbon dioxide, carbon monoxide or oxygen or all in stack gases, etc.

The invention is predicated upon the principle that after a given constituent has been removed from a mixture of gases flowing at a volumetrically uniform rate, the pressure required to force the residual gas through a constricted passage is an accurate indication of the amount of the constituent which has been removed from the mixture, as long as other conditions are constant, or substantially so.

According to this invention this principle is utilized in a continuously flowing stream of a mixture of gases for quantitatively determining a given constituent of the mixture. The mixture of gases is first caused to constantly flow in a stream at a volumetrically uniform rate, for example, a definite number of liters per minute. From this stream the constituent whose quantitative presence it is desired to determine is removed, and a residual stream is then caused to flow through an orifice. The amount of the constituent removed from the stream is continuously determined by indicating the differential pressure between the inlet and the outlet sides of this orifice, pressure indicating apparatus being provided which is preferably calibrated to show directly the percentage which the removed constituent bore to the original mixture of gases.

As will presently be explained in detail, the constituent of the mixture of gases which it is desired to quantitatively determine may be removed in various ways depending in whole or in part upon the nature of the constituent to be removed. Also, depending upon the constituent to be removed, and upon the manner of its removal, the mixture of gases may be preliminarily treated to remove one or more of its constituents which may in one way or another be detrimental to the proper functioning of the constituent-removing means, or which may be otherwise detrimental to the procedure. For example, most mixtures of industrial gases contain moisture in varying proportions or percentages which may be altered by the constituent-removing instrumentalities or substances. In such cases the invention contemplates either the entire removal of the moisture content from the original mixture of gases before it is caused to flow at a volumetrically uniform rate, or the fixing of the moisture content to a definite constant amount or relative humidity. Depending upon whether the moisture content is entirely removed, or is fixed at a definite amount or relative humidity before the stream is caused to flow at a volumetrically uniform rate, the residual stream is treated in the same way so that the pressure determinations of the residual stream will give a true indication of the quantity of the constituent present in the original mixture.

The invention may be further explained by reference to the apparatus which I have provided for practicing it, and which is shown in the accompanying drawings, of which Fig. 1 is a diagrammatic representation of a complete apparatus; Figs. 2 and 3 diagrammatic sectional views of alternate forms of constituent removers; and Fig. 4 a modification of a detail construction for quantitatively determining a plurality of constituents of a mixture of gases.

A mixture of gases, one or more constituents of which it is desired to quantitatively and continuously determine, may be drawn through a conduit 1 by means of a suitable pump or blower 2, the conduit leading from the source of the gas. At the inlet of the conduit there is preferably provided a suitable filter 3 for removing solid and liquid particles found in the gas, and, either before or after the gas enters the blower, it may be caused to flow through a chemical filter 4 provided with suitable materials or otherwise formed to remove from the mixture such of its constituents as may be detrimental to the functioning of the apparatus. From blower 2 the mixture of gases is caused to flow through a conduit 5, which may be provided with a suitable filter 6 for the removal of any oil that may be mixed with the gases as they pass through the pump or blower.

In or at the end of conduit 5 there is also preferably arranged a humidifier for fixing the moisture content of the mixture of gases.

The humidifier may comprise a vessel 7 containing sulfuric acid, the end of conduit 5 extending to the bottom of the vessel so that the gas percolates upwardly through the liquid in the vessel. By providing the vessel with sulfuric acid alone, the entire moisture content of the mixture of gases may be removed; by providing it with water the gases may be saturated with moisture; or by providing it with a definite mixture of water and sulfuric acid the moisture content may be fixed at any constant humidity between these two extremes. In place of using a liquid humidifier such as shown in Fig. 1, the moisture content of the mixture of gases may be entirely removed by causing the mixture to flow through a canister containing a body of calcium chloride, the canister being of the general form diagrammatically illustrated in Fig. 2.

After being preliminarily treated for the removal or fixing of certain constituents of the gas, the mixture is caused to flow at a volumetrically uniform rate while the given constituent desired to be quantitatively determined is being removed. For causing the mixture to so flow, I preferably use the constant gas flow regulator shown in my Patent No. 1,494,856, and which is diagrammatically represented in Fig. 1, the mixture of gases being caused to flow from humidifier 7 to the regulator through a conduit 10 provided with a manually operable valve 11.

As shown in Fig. 1 this regulator comprises a constricted orifice 12 which divides the prolongation of conduit 10 into high and low pressure sections 13 and 14, respectively. A gas relief valve in the high pressure section is controlled by the pressure in the low pressure section so that the volume of gas flowing through orifice 12 is maintained constant. The particular relief valve shown herein comprises a tube 15 containing a body of water or other suitable liquid 16 which is exposed to atmospheric pressure by a tube 17 extending through a stopper 18 which otherwise forms a closure for the top of tube 15. The liquid 16 in tube 15 is in direct communication through a pipe 19 with a body 20 of the same liquid contained in a reservoir 21, the top of which is exposed by a pipe 22 to the pressure of the mixture of gases in a low presure conduit section 14. A pipe 23 extends from the high pressure conduit section 13 to or near the bottom of the tube 15, the lower end of which pipe is sealed by the liquid 16.

In operation, when the pressure of gas in low pressure section 14 increases, the column of liquid 16 proportionately rises and prevents the escape of gas through the lower end of pipe 23 until the pressure of gas in high pressure section 13 has increased in proportion to that of the gas in low pressure section 14. In a similar manner, when the pressure of gas in low pressure section 14 diminishes, the height of the column of liquid 16 is lowered, thereby diminishing by an equal amount the pressure in conduit section 13. In this way, there is automatically maintained a constant difference between the pressures of gas in the two conduit sections on the opposite side of orifice 12 with the result that a uniform volume of gas constantly flows through the orifice.

After causing the stream to flow at a volumetrically uniform rate it is treated for the removal of the constituent which it is desired to quantitatively determine. In Fig. 1 provision is made for removing a constituent by passing the mixture of gases through a liquid solution, which, by way of example, may be a sodium hydroxide solution for the removal of carbon dioxide. The apparatus for this purpose may comprise a pipe 25 attached to low pressure conduit section 14 by a suitable coupling 26 and extending to the bottom of a tube 27 containing a body 28 of the solution, the mixture of gases being caused to bubble upwardly through the solution. A reservoir 29 of this solution may have its lower end connected to the bottom of tube 27 by a pipe 30 and its upper end connected to the upper portion of the tube by a pipe 31, the attachment of pipe 31 to tube 27 being below the upper level of the solution in the tube. In this way the solution may be caused to circulate through tube 27 and the reservoir, fresh solution being taken through the bottom of the reservoir.

The upper end of tube 27 may be connected by a pipe 32 and a coupling 33 to a pipe 34 leading into a humidifier 35 constructed to function in the same manner as humidifier 7 to restore the residual mixture of gases to the same humidity as the original mixture after it passed through humidifier 7. In the embodiment of the invention shown in Fig. 1, the residual gas flows from humidifier 35 through a pipe 36 from which it escapes through a constricted orifice 37 which is preferably the same type or design as orifice 12 in the constant flow regulator. The differential pressure of the residual gas on the opposite sides of orifice 37 may be indicated by a manometer 38 connected by a pipe 39 to pipe 36, or it may be indicated on a recording gage 40 adapted to be operated by a float 41 arranged in one end of an enlarged manometer 42, the other end of which is connected by a pipe 43 to pipe 36.

The manometer 38 or gage 40, or both, are preferably calibrated to indicate in percentage the quantity of a constituent of the gas present in the original mixture of gases. To make such a calibration, a body of gas, such as air, and which contains no constituent which is affected by the constituent remover, is caused to flow through the entire apparatus, and the resulting reading of the manometer or gas is marked as the zero point. Thereafter the air may have added to it a known amount of the constituent desired to be quantitatively determined, to form for example a gaseous mixture containing one percent of the constituent. The removal of this one percent of the constituent reduces the volume of gas a definite amount which results in a different reading of the manometer or gage, which reading is indicated as one percent. This procedure may be carried out as many times as desired for the purpose of calibrating the manometer or gage for any percentage range of readings, it being understoood that by establishing several percentage readings the intervening spaces will proportionately show or indicate fractions of the percentages. When so calibrated the apparatus is in readiness for use to quantitatively determine the varying percentage of a given constituent in a continuously flowing stream of a mixture of gases.

Instead of using a solution for removing a constituent of a mixture of gases, it may be removed by passing the mixture through a canister 45, such as illustrated in Fig. 2, which may be attached to pipes 14 and 34 by couplings 26 and 33. Also, in some cases a given constituent of a mixture of gases may be removed by combustion, and to such end the mixture may be heated by passing it through an electric furnace 46 such as shown in Fig. 3, the furnace being attached to pipes 14 and 34 by couplings 26 and 33. These and other constituent removers may be used alone or in multiple depending upon the particular original mixture of gases and upon the constituent or constituents of it to be quantitatively determined. Furthermore, as will presently be more fully explained, units of the apparatus may be set up in series to quantitatively determine a plurality of constituents of a mixture of gases.

Reference has already been made to the fact that the invention is applicable to the quantitative determination of many different constituents of various mixtures of gases, and that this may be done by merely varying the constituent remover. A few examples of how the invention may be used for removing different constituents will now be given, with the understanding, however, that they are examples and not limitations. In addition to determining carbon dioxide by causing the mixture of gases to flow through a sodium hydroxide solution, this gas may be removed by passing it through a caustic potash solution, or by passing it through a canister 45 (Fig. 2) containing a granular absorbent such as soda-lime. The oxygen content of a mixture of gases may be quantitatively determined by passing the mixture through a solution of alkaline pyrogallol solution, or by passing it through a canister containing Hopcalite (an oxidizing catalyst, one form of which is described in United States Patent No. 1,345,323 to J. C. W. Frazer and C. C. Scalione), or by combustion in a furnace 46. The methane content of a mixture of gases may be determined by passing the mixture through a canister 45 containing an oxidizing catalyst such as platinum at an elevated temperature or containing an absorbent such as granular rosin. From these several examples it will be understood that the invention is applicable to a wide variety of industrial uses.

In making a continuous determination of the percentage of these and other gases which may be found in various mixtures of gases, the original mixture may, if necessary, be passed through mechanical and chemical filters 3 and 4 to remove such solid or liquid particles and gaseous constituents of the original mixture as may interfere with the proper quantitative determination of a particular constituent. The mixture of gases is then passed through a humidifier 7 either for removing its entire moisture content or for constantly fixing it at a predetermined amount. Thereafter the mixture is caused to flow at a volumetrically uniform rate through orifice 12 by means of the gas flow regulator of my Patent No. 1,494,856 which is also shown in Fig. 1 hereof. The mixture then flows through a constituent remover in which the given constituent desired to quantitatively determine is entirely taken from the mixture or is modified in such a way that the pressure of the residual gas is a direct indication of the percentage of the constituent found in the original mixture. The residual gas is then passed through humidifier 35 to cause its humidity to be the same as that of the original mixture after passing through humidifier 7, after which the residual gas is the same as the original mixture except for the change effected in it by reason of the removal of the constituent desired to be quantitatively determined. In proportion to the amount of this constituent present in the original mixture, the pressure of the residual gas on the inlet side of the orifice 37 varies, which differential pressure is shown by manometer 38 or recorder 40 which may be calibrated to indicate percentages. The effect of changes in barometric pressure upon the flow of residual gas from the apparatus does not alter the accuracy of the quantitative determination of a given constituent of the original mixture, first because a barometric change uniformly affects the entire apparatus by exerting itself through tube 17 upon the liquid 16 in tube 15, upon the outlet side of orifice 37, and upon the open legs of manometers 38 or 42; and second, because any increase or decrease in absolute gas density caused by increased or decreased pressure uniformly affects the flow through orifices 12 and 37. Similarly, temperature changes do not affect the accuracy of the apparatus as long as all parts of the apparatus are subjected to the same changes, and to assure uniformity in the temperature of gases flowing through orifices 12 and 37 provision may be made for positively subjecting them and the conduits leading to them to a uniform temperature.

Reference has already been made to the fact that several units of the apparatus may be set up in series to quantitatively determine a plurality of different constituents of a mixture of gases. When it is desired to quantitatively determine a second constituent of a mixture of gases, the residual gas flowing from a constituent remover of Fig. 1 may flow through a conduit 36ª (Fig. 4) provided with a constricted passage or orifice 50, and the differential pressure on opposite sides of this orifice may be indicated by a suitable recorder or by a manometer 38ª graduated to indicate the percentage volume of the first constituent removed from the mixture. From the outlet side of orifice 50 the residual gas may flow through a conduit 51 leading to a constant flow meter and constituent remover arranged in series the same as shown in Fig. 1, the second constituent remover being constructed to remove the second constituent of the gas desired to be quantitatively determined. A series of several units may thus be provided to successively remove a plurality of constituents of a mixture of gases. It is obvious that in the quantitative determination of a second constituent of a mixture of gases either all or a portion of the residual gas which passes through the first constituent remover may be passed through the second unit of the apparatus.

I claim as my invention:

1. The method of continuously determining quantitatively a given constituent of a mixture of gases, comprising causing a stream of the mixture to constantly flow at a volumetrically uniform rate, removing the given constituent of the gas from said stream, causing the residue gas to flow through a constricted passage, and indicating the differential pressure of the residue gas on the opposite sides of the constricted passage.

2. The method of continuously determining quantitatively a given constituent of a mixture of gases, comprising uniformly humidifying a stream of the mixture, causing a stream to constantly flow at a volumetrically uniform rate, removing the given constituent of the gas from said stream, restoring the residue gas to its first-mentioned uniform humidity, causing the residue gas to flow through a constricted passage, and indicating the differential pressure of the residue gas on opposite sides of the restricted passage.

3. The method of continuously determining quantitatively a given constituent of a mixture of gases, comprising subjecting the mixture of gases to the action of a purifier, causing a stream of the purified mixture to constantly flow at a volumetrically uniform rate, removing the given constituent of the gas from said stream, causing the residue gas to flow through a constricted passage, and indicating the differential pressure of the residue gas on the opposite sides of the passage.

4. An apparatus for continuously determining quantitatively a given constituent of a mixture of gases, comprising in series in the order stated, a constant flow regulator for causing a stream of the mixture to flow constantly at a volumetrically uniform rate, means for removing a given constituent from the stream, a restricted passage through which the residue gas flows, and a pressure indicator for determining the differential pressure of the residual gas on opposite sides of said passage.

5. An apparatus for continuously determining quantitatively a given constituent of a mixture of gases, comprising in series in the order stated, a gas purifier, a humidifier, a constant flow regulator for causing a stream of the mixture to flow constantly at a volumetrically uniform rate, means for removing a given constituent from the stream, a second humidifier, a constricted passage through which the residue gas is caused to flow, and a pressure indicator for determining the differential pressure of the residual gas on opposite sides of said passage.

In testimony whereof, I sign my name.

ROSCOE P. MASE.